United States Patent [19]

Anderson, II et al.

[11] Patent Number: 5,495,329
[45] Date of Patent: Feb. 27, 1996

[54] ADAPTIVE LAMP CONTROL

[75] Inventors: Earl C. Anderson, II, Longmont; Mark Koch, Arvada, both of Colo.

[73] Assignee: Pentax Technologies Corporation, Bloomfield, Colo.

[21] Appl. No.: 344,627

[22] Filed: Nov. 17, 1994

Related U.S. Application Data

[63] Continuation of Ser. No. 950,234, Sep. 24, 1992, abandoned.

[51] Int. Cl.⁶ ................................................... H04N 1/40
[52] U.S. Cl. ............................................ 356/218; 356/229
[58] Field of Search ....................................... 356/218, 229

[56] References Cited

U.S. PATENT DOCUMENTS

| | | |
|---|---|---|
| 3,952,144 | 4/1976 | Koker . |
| 4,516,852 | 5/1985 | Liu et al. ............................. 356/218 |
| 4,831,564 | 5/1989 | Suga ................................... 364/551.01 |
| 5,081,395 | 1/1992 | Kikuchi et al. . |
| 5,105,264 | 4/1992 | Erhardt ..................................... 358/48 |
| 5,139,745 | 8/1992 | Barr et al. ............................... 356/440 |
| 5,153,745 | 10/1992 | Brandkamp et al. .................... 358/475 |
| 5,170,267 | 12/1992 | Blitz et al. .............................. 358/475 |
| 5,189,340 | 2/1993 | Ikeda . |
| 5,216,526 | 6/1993 | Ju .............................................. 358/475 |
| 5,336,976 | 8/1994 | Webb et al. . |

FOREIGN PATENT DOCUMENTS 77570   5/1985   Japan ..................................... 358/475

*Primary Examiner*—Richard A. Rosenberger
*Attorney, Agent, or Firm*—Sandler, Greenblum & Bernstein

[57] ABSTRACT

A method and apparatus for determining the quality of an illuminating device, such as an elongated lamp, that is useable with an imaging device, such as a scanner. Electrical power is supplied to the lamp so that it emits a light beam. The light beam is then measured and a determination is made as to whether the emitted light of the lamp is within one or more predetermined values, which include overall brightness, stabilized output power, and profile flatness values.

54 Claims, 9 Drawing Sheets

DELTA FROM PREVIOUS IS EXCESSIVE. NOT YET STABLE.

DELTA FROM PREVIOUS IS EVEN MORE EXCESSIVE. NOT YET STABLE.

DELTA FROM PREVIOUS IS MINIMAL. PASSES STABILITY TEST.

VMAX = MAXIMUM USABLE ADC VOLTAGE
VMIN = MINIMUM USABLE ADC VOLTAGE
VØ = ZERO VOLTS

ADAPTIVE LAMP CONTROL

This application is a continuation of application Ser. No. 07/950,234, filed Sep. 24, 1992, now abandoned.

BACKGROUND OF THE INVENTION

1. Field of the Invention

The present invention pertains to methods, procedures and apparatus for determining (i.e., diagnosing) the acceptability of an illuminating device, such as a fluorescent lamp that is used with an image scanner.

2. Discussion of Background and Relevant Information

Imaging devices, such as, for example, optical image scanners, employ an illuminating device (radiation emitting device), such as an elongated fluorescent lamp, to illuminate an object that is to be scanned. One of the problems faced by such an imaging device is that variations in the brightness or intensity of the lamp from one scanner to another scanner, from one scan to another scan, or from various portions of a single scan with any particular scanner, can occur. In order to obtain an accurate, uniform scanning, the amount of radiation (light) that is output by the fluorescent lamp must be uniform along its entire length. Any non-uniformity in the light source can translate into an inaccurate output scan of the object. For instance, new fluorescent lamps tend to be brighter at the center of the lamp as compared to their extremities. Alternatively, older lamps tend to be dimmer at their centers as compared to their extremities.

In addition, an output of a scanning array, such as, for example, a plurality of pixels in a charge coupled device (CCD) array employed in the imaging device, varies from pixel to pixel, due to, for instance, manufacturing tolerances. Accordingly, it is desirable to have a means for adjusting the apparent brightness of the lamp so as to obtain a uniform output from the imaging device.

Scanners have been designed that perform a "block pixel" calibration, wherein pixel-block-to-pixel-block variations are accommodated by adding or subtracting calculated block values from the block values outputted by the CCD array used in the scanner. Other scanners perform such a calibration on individual pixels, wherein pixel-to-pixel variations are accommodated within a particular range by adding or subtracting calculated values from the values obtained/output by the CCD array employed in the scanner.

The above-described calibrations are typically performed by initially positioning the CCD array proximate a uniform "white" strip, of a high reflectance material, just ahead of a leading edge of the object to be scanned. The brightness of the lamp and a "CCD sense window" of the scanner are set to a predefined default setting, and the calibration white strip is read. Based upon values obtained by the CCD, offset values are calculated which are used during a scanning operation in order to attempt to compensate for non-uniformity and to achieve a uniform output across the scanned image.

However, as noted above, the characteristics of the lamp are not consistent from one lamp to another lamp. For example, the amount of time required for the lamp to warm-up (referred to as a "warm-up" time) to produce a desired output level (brightness) varies from lamp to lamp. Hence, prior art scanners have no way for determining whether the lamp has warmed up sufficiently to begin the above-described calibration process.

Accordingly, prior art scanners have had to employ a fixed warm-up time period that is greater than that which is typically needed. After the warm-up time period elapses, the prior art scanners operate under the assumption that the lamp has reached the predetermined brightness level, and the calibration procedure described above is performed.

However, if the lamp reaches the predetermined brightness level in a time period that is less than the fixed warm-up time period, the scanning device must wait until the fixed warm-up time period elapses, thereby reducing the operating speed of the scanner. Similarly, the prior art scanners do not detect instances when the lamp has not yet reached the predetermined brightness level within the fixed warm-up time period. Thus, in that situation, the calibration process will begin with a non-stabilized operating light source, possibly affecting the quality of the scanning operation.

Furthermore, it has been observed that when the lamp nears the end of its useful life, the brightness of the lamp dramatically decreases. However, there is a point beyond which the image sensing device (CCD array) is no longer able to quantify the diminished level of light. This can occur with respect to the entire CCD array, or with respect to individual pixels of the array, leading to a scan that is not uniform.

Similarly, it has also been observed that a lamp can be overly bright, such that the image sensing device (CCD array) is no longer able to quantify the overly bright level of light. This can occur with respect to the entire CCD array, or with respect to individual pixels of the array. In such a situation, the increased brightness saturates the image sensing device, leading to a scan that is not uniform.

SUMMARY OF THE INVENTION

Accordingly, it is an object to the present invention to develop an adaptive lamp control system that can determine whether the brightness level of the lamp has become stabilized within a predetermined brightness range.

An advantage of the present invention is the ability to determine whether the lamp reaches the predetermined brightness range within a predetermined period of time.

A further advantage of the present invention is the ability to determine whether the brightness level of the illuminating device has drastically decreased, indicating that the lamp is at the end of its useful operating life.

Another advantage of the present invention is the ability to determine whether the increased brightness level of the illuminating device results in the saturation of the sensing device, affecting the uniformity of the scanning operation.

According to an object of the present invention, an apparatus is provided for determining the quality of an illuminating device, and comprises means for emitting light by the illuminating device, means for measuring the emitted light, and means for determining whether the emitted light of the illuminating device is within a predetermined value.

According to a preferred embodiment, the predetermined value comprises a minimum value. Alternatively, the predetermined value comprises a maximum value. The apparatus of the present invention is capable of determining whether a brightness of the illuminating device is within the predetermined value within a prescribed time period.

According to an object of the present invention, the measuring means determines an evenness of a brightness of the illuminating device. Further, the measuring means can determine whether the evenness of the brightness is within a selected range. The preferred embodiment of the apparatus of the present invention can also perform a stability of brightness test on the illuminating device.

According to an object of the present invention, a method for determining a performance of an illuminating device is disclosed, comprising the steps of activating the illuminating device to emit a radiation, measuring an output of the radiation over a plurality of time periods, determining whether the radiation output stabilizes within a predetermined period of time from when the illuminating device has been activated, measuring a radiation level of the illuminating device at a plurality of locations of the illuminating device, determining whether the radiation level of the illuminating device at the plurality of locations is within a preselected range, measuring an overall radiation intensity of the illuminating device, and determining whether the overall radiation intensity is at least equal to a selected minimum value.

The method of the present invention further comprises the step of de-activating the illuminating device and indicating an unacceptable determination if the radiation output does not stabilize within the predetermined time period, or the radiation level of the illuminating device at the plurality of locations is outside of the preselected range, or the overall radiation intensity is less than the selected minimum value or greater than a selected maximum value.

According to an advantage of the present invention, the step of determining whether the radiation output stabilizes within the predetermined period of time from when the illuminating device has been activated comprises comparing a previous measurement result to a current measurement result to determine a similarity of the measurement results.

According to another advantage of the present invention, the method further comprises retesting a preset number of times any determination that results in an unacceptable determination. Alternatively, the retesting can be for a prescribed time period.

Another advantage of the present .invention is that a determination is made as to whether the overall radiation intensity exceeds a selected maximum value.

According to an object of the present invention, an apparatus for determining the quality of an illuminating device is disclosed that comprises a sensor, means for activating the illuminating device to emit a source of light, the light source being directed towards a reference strip and being detected by the sensor, and an analyzer that interprets an output signal of the sensor to determine a condition of the illuminating device.

According to an advantage of the present invention, an indicator is provided that indicates when the analyzer determines that a condition of the illuminating device is outside of a desired performance range.

Another advantage of the present invention is that the sensor comprises a scanning array, such as, for example, a charge coupled device (CCD).

According to the present invention, the analyzer comprises means for determining whether an output of the illuminating device has stabilized, means for determining an output flatness of the illuminating device if it is determined that the output of the illuminating device has stabilized, and means for determining whether an overall brightness of the illuminating device is at least equal to a minimum set value if it is determined that the output flatness of the illuminating device is within a predetermined range.

According to an advantage of the invention, the analyzer further comprises means for determining whether the overall brightness of said illuminating device exceeds a maximum set value.

According to one advantage of the present invention, the means for determining whether an output of the illuminating device has stabilized comprises means for comparing an immediately preceding output reading with a current output reading.

According to another advantage, the means for determining the output flatness of the illuminating device comprises means for obtaining a plurality of output reading at various locations of the illuminating device, the plurality of output readings at various locations being compared to each other to determine a variation from one location to another location.

According to another object of the present invention, a method is disclosed for determining a performance of an illuminating device, comprising the steps of detecting a light beam produced by the illuminating device, and determining whether the detected reflected light beam indicates that the performance of the illuminating device is within a desired prescribed range.

According to one advantage of the present invention, the illuminating device illuminates a reference strip, and a light beam reflected from the reference strip is detected.

According to another advantage of the present invention, the method further comprises providing an indication when it is determined that the performance of the illuminating device is outside of the desired prescribed range.

According to another advantage of the present invention, the method further comprises employing the illuminating device in an imaging device, and calibrating the illuminating device to compensate for detected variations in the illuminating device if it is determined that the performance of the illuminating device is within the prescribed range.

According to the present invention, the determining step of the present invention comprises a first step of determining whether an output of the illuminating device has stabilized, a second step of determining an output flatness of the illuminating device, and a third step of determining an overall brightness of the illuminating device.

It is noted that the present invention is not limited to performing the determination steps in any particular order. Accordingly, the phrases "first step" "second step" and "third step" described above and in the claims, are shorthand terms that are used to describe determining whether an output of the illuminating device has stabilized, determining an output flatness of the illuminating device, and determining an overall brightness of the illuminating device, respectively. Once it is determined that the output of the illuminating device has stabilized, there is no special order in which the remaining determinations must be performed.

According to an advantage of the present invention, the third determining step comprises obtaining a plurality of readings of the light beam at one time along a plurality of locations of the illuminating device and determining whether the plurality of readings exceed a selected maximum acceptable brightness threshold level.

Another advantage of the present invention is that the first determining step is performed up to a predetermined period of time. Alternatively, the first determining step is performed up to a predetermined number of times.

Another advantage of the present invention is that the second determining step is performed if it is determined that the output of the illuminating device has stabilized, and the third determining step is performed if it is determined that the output flatness of the illuminating device is within a predetermined range.

A still further advantage of the present invention is that the illuminating device is de-activated and a test failure result is indicated if the detected reflected light beam is determined not to have stabilized within a predetermined time period, or the output flatness of the illuminating device is determined to be outside of a preselected range, or the overall brightness of the illuminating device is determined to be less than a selected minimum value.

According to a preferred embodiment of the present invention, an immediately preceding light beam reading is compared with a current light beam reading. In one type of comparison, a plurality of light beam readings at various locations of the illuminating device are compared with one another to determine a variation from one location to another location.

According to an advantage of the present invention, a plurality of readings of the light beam are obtained at one time along a plurality of locations of the illuminating device to determine whether the plurality of readings are at least equal to a selected minimum acceptable brightness threshold level.

According to another object of the present invention, a method for determining the useability of a radiation emitting device associated with an imaging device is disclosed, comprising the steps of supplying electrical power to an elongated radiation emitting device so that the elongated radiation emitting device emits radiation, receiving the radiation with an imaging array, determining whether an output power of the elongated radiation emitting device has stabilized by successively measuring the received radiation beam at a plurality of locations of the elongated radiation emitting device, and comparing a present measurement with an immediately preceding measurement, the output power of the elongated radiation emitting device being determined to have stabilized when a difference value between two measurements is less than a selected value, indicating a failure condition if it is determined that the output power of the elongated radiation emitting device has not stabilized, determining a profile flatness of the elongated radiation emitting device, when it is determined that the output power of the elongated radiation emitting device has stabilized, by comparing radiation measurement readings at a predetermined number of sample points obtained at a certain time interval along the elongated radiation emitting device to one another, the measurement readings yielding a greatest reading and a smallest reading, indicating the failure condition if it is determined that an absolute value of a difference between the greatest value and the smallest value exceeds a selected maximum allowable difference, determining an overall brightness of the elongated radiation emitting device, when the absolute value does not exceed the selected maximum allowable difference, by determining whether radiation measurement readings at a predetermined number of sample points along the elongated radiation emitting device are at least equal to a selected minimum acceptable brightness threshold level, and indicating the failure condition if it is determined that at least one radiation measurement reading at the predetermined number of sample points along the elongated radiation emitting device is less than the selected minimum acceptable brightness threshold level.

According to an advantage of the present invention, a further step of increasing or decreasing a sense window of the imaging array is provided to increase or decrease an exposure time of the radiation beam on the imaging array, thus increasing or decreasing a received overall brightness of the elongated-shaped radiation emitting device, after which the overall brightness determination is repeated, if it is determined that at least one of the predetermined number of sample points along the elongated radiation emitting device are less than the selected minimum acceptable brightness threshold level or more than a selected maximum acceptable brightness level. The adjustment of the sense window varies the time before voltages that correspond to an amount of light that has fallen on the array are stored.

According to another advantage of the present invention, the method further comprises the steps of determining whether the radiation measurement readings at the predetermined number of sample points along the elongated radiation emitting device exceed a selected maximum acceptable brightness threshold level, and indicating the failure condition if it is determined that at least one radiation measurement reading at the predetermined number of sample points along the elongated radiation emitting device exceeds the selected maximum acceptable brightness threshold level.

According to a preferred method of the present invention, a method is disclosed for diagnosing a performance of a radiation emitting device, comprising the steps of supplying electrical power to an elongated radiation emitting device so that the elongated radiation emitting device emits radiation towards a reference strip, receiving a beam of radiation that is reflected from the reference strip with an imaging array, a first determining step of determining whether an output power of the elongated radiation emitting device has stabilized by successively measuring the received radiation beam at a plurality of locations of the elongated radiation emitting device, and comparing a present measurement with an immediately preceding measurement, the output power of the elongated radiation emitting device being determined to have stabilized when a difference value between two measurements is less than a selected value, a second determining step of determining a profile flatness of the elongated radiation emitting device by comparing radiation measurement readings at a predetermined number of sample points obtained at a certain time interval along the elongated radiation emitting device to one another, a third determining step of determining an overall brightness of the elongated radiation emitting device by determining whether radiation measurement readings at a predetermined number of sample points along the elongated radiation emitting device are at least equal to a selected minimum acceptable brightness threshold level, and indicating a failure condition after the first determining step, the second determining step and the third determining step are performed if either the first determining step, the second determining step or the third determining step indicates an out-of-range condition.

An advantage of the present invention is that the sense window of the imaging array can be to varied to increase or decrease an exposure time of the reflected radiation beam on the imaging array, thus increasing or decreasing a received overall brightness of the elongated radiation emitting device. Additionally, the overall brightness determination can then be repeated if it is determined that at least one of the predetermined number of sample points along the elongated radiation emitting device are less than the selected minimum acceptable brightness threshold level or greater than a selected maximum acceptable threshold level.

BRIEF DESCRIPTION OF THE DRAWINGS

The foregoing and other objects, features, and advantages of the invention will be apparent from the following more particular description of the preferred embodiments as illustrated in the accompanying drawings, which are not necessarily drawn to scale, in which like reference characters refer to the same parts throughout the various views, and wherein.

DESCRIPTION OF THE PREFERRED EMBODIMENTS

Figure 1:
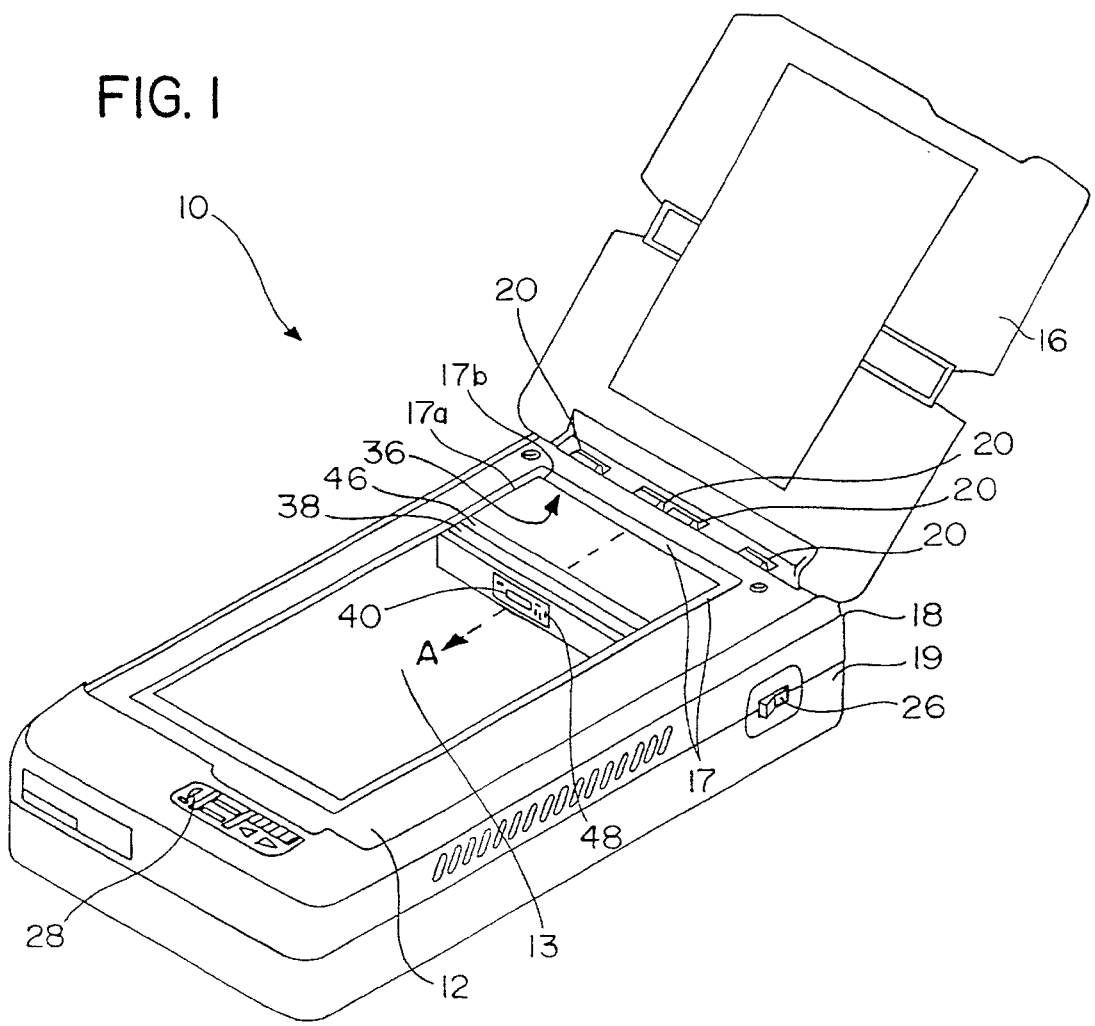
FIG. 1 illustrates a scanner in which an adaptive lamp control of the present invention can be employed.

The present invention is applicable to any imaging device, such as, for example, a scanner, facsimile machine, copier, or other image reading device. A non-limiting example of a typical imaging device, such as a scanner 10, is illustrated in FIG. 1. It is understood that the scanner 10 illustrated in the drawings is for the purpose of understanding the present invention. Various alterations in form and detail of the scanner 10 may be made without departing from the spirit and scope of the present invention.

Figure 2:
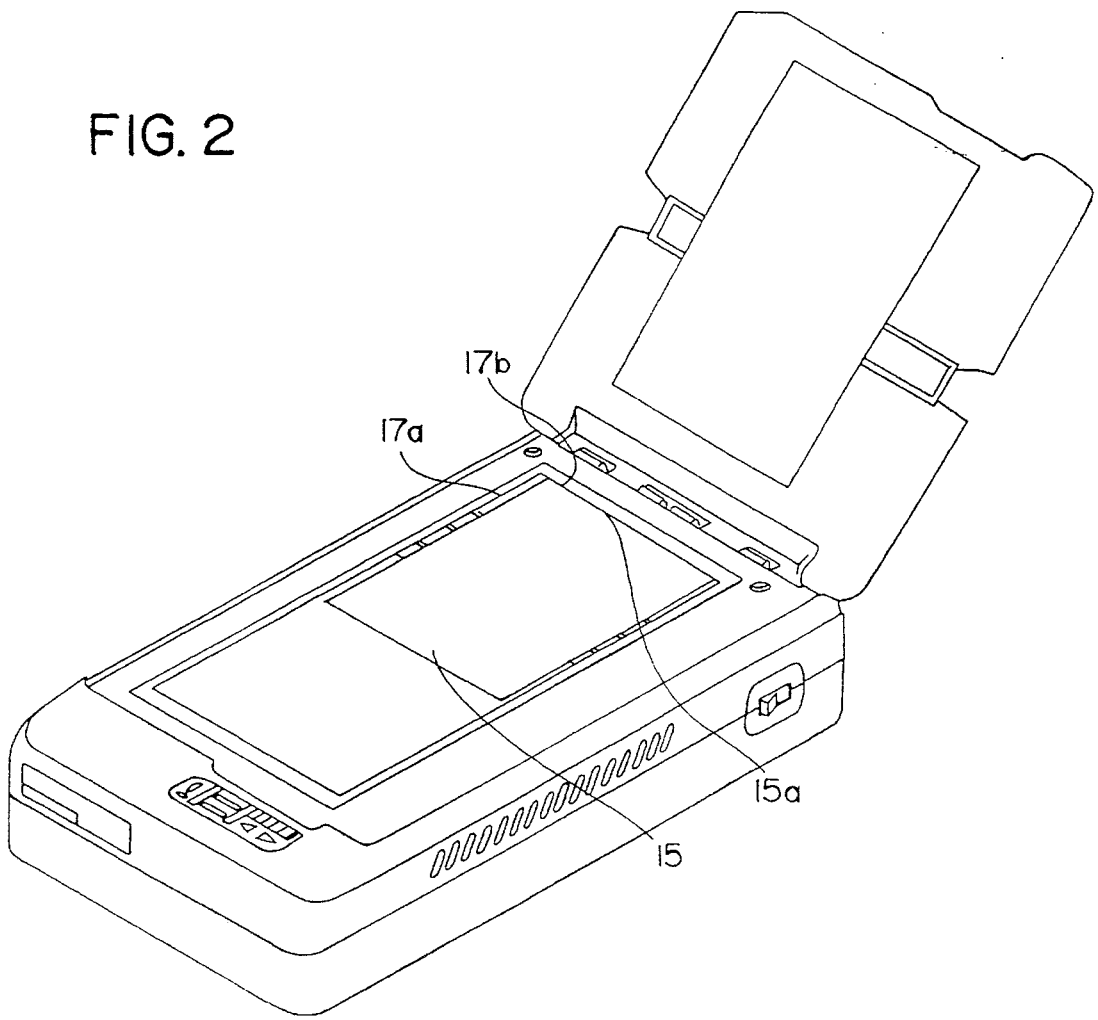
FIG. 2 illustrates the positioning of a document sheet on a platen glass of the scanner of FIG. 1.

The scanner 10 of FIG. 1 has a top surface 12 with a platen glass 13 upon which a document sheet 15 (FIG. 2), which will be described below in detail, is placed. An upper cover 16 is provided and is pivotable about a pivot axis (not shown) that is located proximate a rear portion 18 of the scanner 10 by means of a plurality of hinges 20.

A power switch 26 is mounted on a side portion 19 of the scanner 10 to selectively turn the scanner ON and OFF. A power lamp 28, located on the top surface 12 of the scanner 10 indicates when the scanner is operational; that is, when the power switch 26 is turned ON to supply electrical power to the scanner 10. An interface connector (not shown), located on the rear portion 18 of the scanner 10, interfaces the scanner 10 to a processing device, such as a computer (not shown).

According to the embodiment shown in FIG. 1, the document sheet 15 is manually placed face down on the platen glass 13 (FIG. 2), so that it is registered against edges 17a and 17b of platen frame 17, resulting in the document sheet 15 being placed at a 0,0 position. Position 0,0 refers to the x-coordinate and y-coordinate, respectively, of an image reading unit that is part of the scanner 10. Alternately, a document sheet feeder (not shown), can be attached to the scanner 10 to automatically feed and position at least one document sheet 15 at the 0,0 position.

According to the embodiment of FIG. 1, an image reading unit is positioned below the platen glass 13, which is driven by motor 60 and wheels 32 (shown in FIG. 9), to scan the document sheet 15. The image reading unit is shown in greater detail in FIG. 3. In this example, the image reading unit comprises a source of illumination, such as an elongated fluorescent lamp 38, a light detecting element, such as a charge coupled device (CCD) array 40 that is mounted on a printed circuit board 48, and an optical lens group 42 (schematically illustrated) that forms a reproduced image on the surface of the CCD array 40 of an original image carried by the document sheet 15 that has been illuminated by the lamp 38. The level of the reflected light at the CCD array 40 is digitized and transmitted to the computer. However, it is understood that numerous other constructions of the imaging device can be implemented, the specific construction of the imaging device not being intended to limit the spirit and scope of the present invention. For example, a lamp other than an elongated fluorescent lamp may be used.

Figure 3:
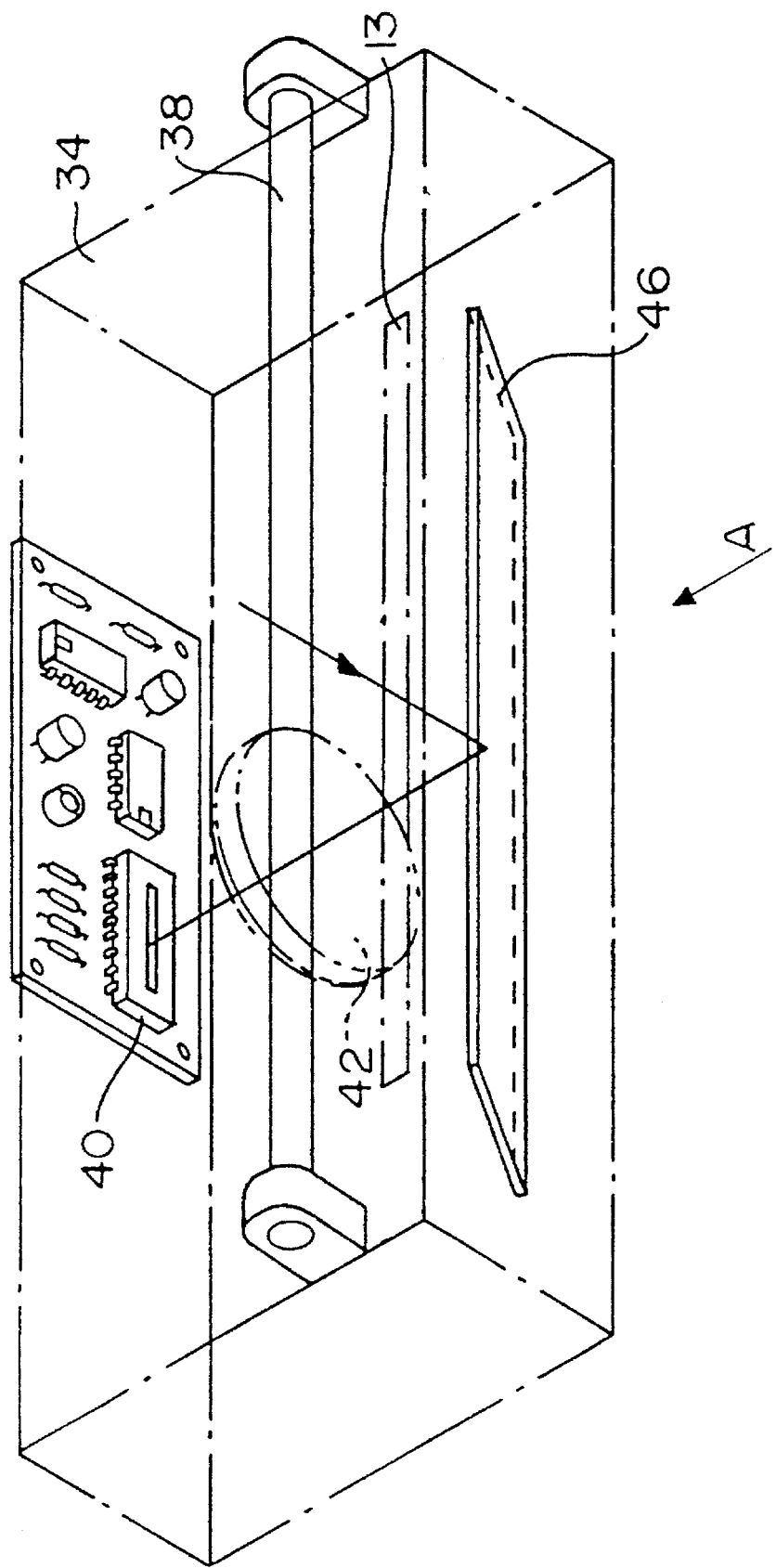
FIG. 3 illustrates one example of an image reading unit that can be employed with the scanner of FIG. 1.

During scanning operations, the surface of the original document sheet 15 is irradiated by the fluorescent lamp 38. As shown in FIG. 3, light passes through the platen glass 13, is reflected by a mirror 46, passes through the lens group 42 and forms a reproduced image on the CCD array 40. At the same time, the drive mechanism moves the image reading unit in a direction perpendicular to the main scanning direction, as indicated by arrow A in FIGS. 1 and 3.

As noted above, the document sheet 15 is stationary in the embodiment of FIG. 1, and the image reading unit is driven to scan the document sheet 15. However, it is understood that the present invention can also be employed with a scanner in which the image reading unit is stationary and the document sheet 15 is moved past the image reading unit.

According to the embodiment of FIG. 1, prior to a scan of the document sheet 15, the image reading unit is positioned behind the 0,0 position of the scanner. That is, the image reading unit is positioned before a leading edge 15a (FIG. 2) of the document sheet 15. A reference calibration strip 36, such as, for example, a white, highly uniform reflective sample strip having a reflectance of at least 85 percent, is positioned on the underside of the platen frame 17 proximate edge 17b to face towards the image reading unit, as illustrated in FIG. 1.

However, it is understood that the reference strip 36 can be opaque or even transmissive, depending upon the particular arrangement of the CCD array and lamp. For example, if the system is designed to use clear transparency documents, it may be desirable to locate the CCD array and lamp on opposite sides of the document and to employ a reference transmissive strip. The reference strip 36 (also referred to as a "white strip" in this embodiment) is used to calculate offset values that are used during a scanning operation in order to compensate for a non-uniform output across the length of the lamp 38. The calibration procedure is performed just prior to the scanning of the document 15, and is not repeated during the scanning of the document 15, as the document 15 cannot be used as a reference calibration guide, since the "color" of the document 15 may not correspond to the desired color of the reference strip 36.

As noted above, prior to the beginning of a scanning operation, the image reading unit reads the reference strip 36 and generates digitized data representing the scanned reference strip 36. This digitized information is used to make an assessment of the quality of the lamp 38. If the obtained digitized data is determined to be within a predefined specification, a determination is made as to the level of correction (if any) that will be required during the scanning operation and digitizing of the document sheet 15. This initial correction operation must be done to eliminate variations in individual pixels within the CCD array 40, and any imbalance that may exist in the lamp 38. This adjustment may be done on a pixel-by-pixel basis, or on blocks of pixels. However, it is noted that performing the adjustment on blocks of pixels does not correct for individual pixel errors in the CCD array 40.

As previously noted, the brightness of the lamp 38 varies along its length, over time during warm-up, and over the life of the lamp 38 as it ages. The adaptive lamp control of the present invention will sense and either correct the variation if it can do so within predetermined limits (by adding or subtracting values so as to compensate, or normalize, the values across the image to produce an acceptable result given the dynamic range and specified signal to noise ratio), or indicate that the lamp 38 has failed to achieve one or more of the predetermined performance parameters.

The situations that can cause unacceptable image reading artifacts can be grouped into three general categories. These are referred to as stability of brightness problems, flatness of profile problems, and overall brightness problems. Each situation will be discussed separately.

A. Stability of Brightness

Stability of brightness problems relate to the period immediately after electrical power is first applied to the lamp 38. Due to the construction characteristics of the source of illumination that is used, some period of time must elapse before the lamp 38 achieves a steady state output illumination profile. The required period of time varies from lamp to lamp, and also varies in accordance with the age of the lamp. In addition, a greater period of time is required for the lamp to reach its steady state terminal output illumination profile when the lamp is "cold" (that is, when the lamp has been OFF for a long period of time), than when the lamp has only recently been activated.

Any use of the lamp for scanning during the time in which the illumination of the lamp is still changing and before it reaches its steady state terminal output illumination profile will most likely cause the scanned output to become lighter as the scanning progresses, because the compensation values obtained during the calibration scanning of the reference white strip 36 will be based upon an old illumination level of the lamp 38.

As previously noted, newer lamps tend to be brighter towards the center of the lamp, while older lamps tend to be darker at the center. This fact, along with performance variations among the individual pixels of the CCD array and imperfect optics, contribute to some degree of output non-uniformity. While these variations can be compensated, to some extent, by the calibration procedure described above, situations can arise wherein the necessary compensation would be excessive, limiting the dynamic range of the scanning system, and hence the number of shades of gray that may be detected by the CCD array 40.

In order to avoid the brightness stability problem, a long warm-up time period can be selected before a scanning operation commences. However, since some lamps will become fully warmed up in a significantly shorter period of time, and some lamps will not become fully warmed up within the selected warm-up time period, such a method is not desirable.

FIGS. 4A–4G illustrate a method and apparatus for determining the actual state of a lamp warm-up stability according to the present invention, so as to avoid the above-noted problems.

As described above, the CCD array 40 detects light that is emitted by the lamp 38 and reflected from the reference white strip. According to a preferred embodiment of the present invention, five points P1–P5, across the width of the lamp 38, are sampled at four separate time intervals T1–T4 by the CCD array 40. The values found at each sample point are compared with the values found in a previous time period at the same sample point to obtain a Delta value, also referred to in the drawings as Max$\Delta$v (see, e.g., FIGS. 4C and 4E). Accordingly, one can determine the degree to which a lamp's illumination (i.e., brightness) is still changing with time. A limit value can be selected that is suitable for use with the environment in which the lamp is to be used, and if the Delta value between any point's current value and its previous value exceeds the selected limit, the lamp output is determined to not yet be stable enough to be used.

Figure 4A:
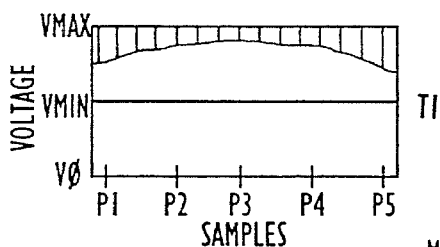
FIGS. 4A–4G graphically illustrate the results of a Stability Test performed on an illuminating device that can be employed in the scanner of FIG. 1.
Figure 4B:
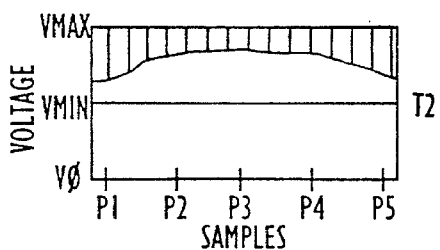
Figure 4D:
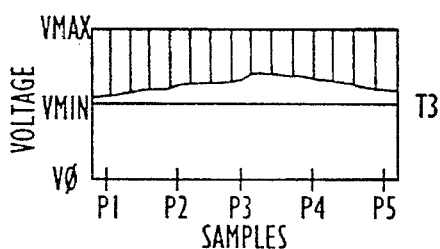
Figure 4F:
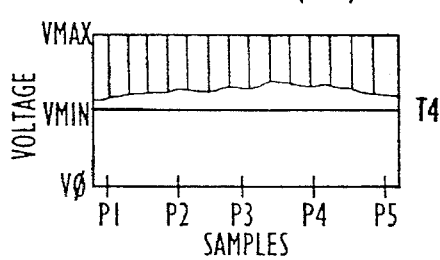
Figure 4C:
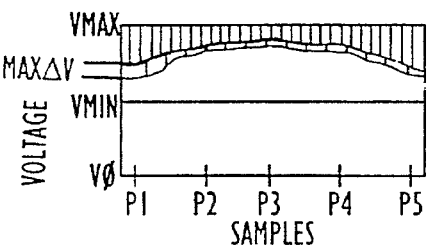
Figure 4E:
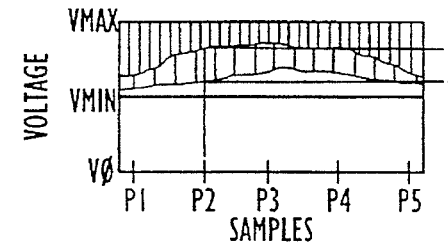
Figure 4G:
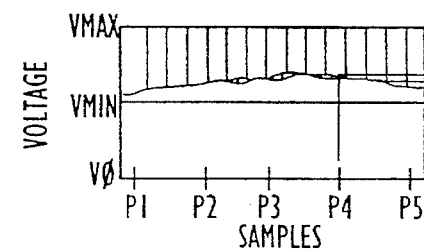

Referring to FIG. 4A, five sample points P1–P5 are obtained at time T1. Thereafter, the five points P1–P5 are re-sampled at time T2, as shown in FIG. 4B, and subtracted from the first results (indicated in FIG. 4A) to obtain the Delta value Max$\Delta$v shown in FIG. 4C. In FIG. 4C, the Delta value Max$\Delta$v is greater than the limit value. Accordingly, the five points P1–P5 are re-sampled at time T3 (as shown in FIG. 4D), and the results are subtracted from the results obtained at time T2 to obtain the Delta value Max$\Delta$v shown in FIG. 4E. As shown in FIG. 4E, the Delta value Max$\Delta$v is still greater than the limit value. Accordingly, the five points are resampled at time T4 (as shown in FIG. 4F). The results obtained at time T4 are subtracted from the results obtained at time T3 (as shown in FIG. 4G). This time, the Delta value Max$\Delta$v is less than the limit value. Accordingly, the brightness of the lamp is determined to have stabilized.

It is to be understood that the number of sample points P may vary from five and that the checked time intervals T may vary from four without departing from the scope and spirit of the present invention. For example, five adjacent points in five positions may be sampled, in which each point comprises five pixels that are averaged together. However, any number of points may be selected and averaged together. The lamp 38 will not show a sudden, abrupt discontinuity in its output. Thus, it is permissible to average the five adjacent pixels, reducing the possibility that any radical discontinuity in the output profile may be caused by, for instance, a small mark on the reference strip 36 or a bit of dust on the optics, which would skew the tests, resulting in a false determination that the lamp 38 has a poor profile.

It is also understood that the above-described test may be discontinued when the time T exceeds a predetermined time period, indicating that the lamp 38 is still warming up and that the time required is excessive for the chosen application. When such a situation occurs, a warning indication can be provided to notify a user of the existence of a problem.

B. Flatness of Profile

Once it is determined that the brightness of the lamp 38 has reached a useable, stable level, the lamp 38 can be tested to determine the uniformity (or flatness) of the result across the scan line of the CCD array. This is necessary, because while the calibration step can provide a compensation to equalize the output of the system so as to produce a "flat" output, the use of excessive compensation values will limit the dynamic range of the lower performing pixels in the scanning array.

Figure 5:
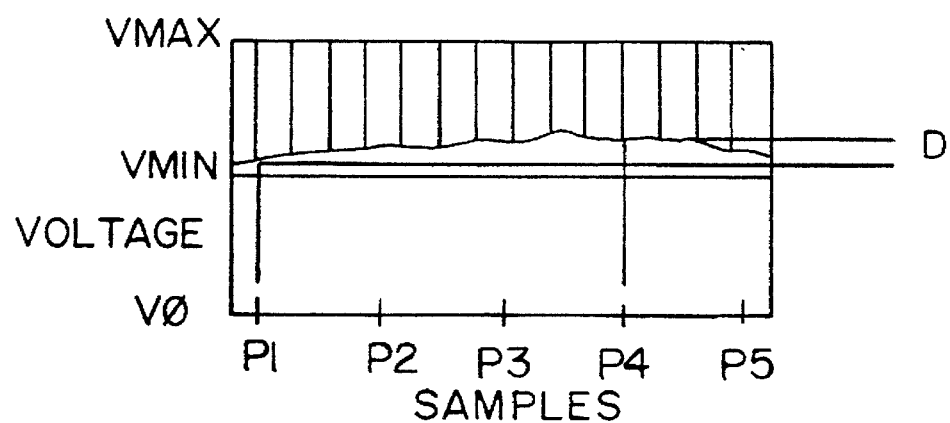
FIG. 5 graphically illustrates the result of a Profile Test that is performed on the illuminating device that can be employed in the scanner of FIG. 1.

Referring to FIG. 5, one example of a flatness of profile test result is shown. The procedure for determining the flatness of profile is similar to the procedure for determining brightness stability. A predetermined number of sample points P (such as the five points P1–P5 shown in FIG. 5) are chosen, and readings are obtained for a predetermined time interval. However, instead of comparing the brightness of the selection points to the brightness of a previous time interval, as is done in the brightness stability test, the flatness of profile test compares each sample point P (such as, for example, P1) to the other sample points (such as, for example, P2–P5) in the same time interval.

As shown in the example illustrated in FIG. 5, sample point P1 produces the lowest reading, while sample point P4 produces the highest reading. The absolute value of P1 less P4 yields a difference value D. As long as the difference value D is less than or equal to a pre-selected maximum allowable difference, the difference can be satisfactorily compensated by calibration and the scanning device (including the lamp 38) is considered to pass the flatness of profile test.

If the absolute value of P1 minus P4 yields a difference value D that exceeds the selected maximum allowable difference, an error message can be issued by the imaging device.

It is understood that numerous variations on this test procedure can be implemented without affecting the scope or spirit of the present invention. For example, in one test variation, additional tests at predetermined time intervals can be performed to determine whether the lamp 38 can create a more appropriate and acceptable illumination profile. However, in order to prevent the occurrence of a possible endless test loop, wherein the flatness of profile test is continuously performed due to repeated test failures, a time limit can be selected, so as to limit the number of flatness of profile tests that are performed. If the test still fails when the selected time period expires, an error indication is provided. A second test variation can be where the flatness of profile test is repeated up to a selected maximum number of times.

C. Overall Brightness

Even though the lamp 38 may pass the stability test and the flatness of profile test, it is possible that the overall brightness of the lamp 38 necessary to obtain a satisfactory imaging result may not be achieved. For example, if the overall illumination level is too small, the dynamic range across the entire image may suffer and be degraded by the degree of compensation that is required to achieve a desired brightness level on all the pixels of the CCD array 40. Accordingly, it is necessary to determine the overall brightness of the system.

The operational principles of a scanning array permit a certain degree of control variation that can be used to affect the outcome of this test. When light falls upon the surface of a CCD array, each respective pixel is charged. The amount of charge on the pixels is related to the exposure time period for each line of a scan, as determined by a predetermined sense window. The CCD sense window is defined as the exposure time period before the voltages accumulated on the CCD elements (pixels) are shifted to holding registers and can no longer be affected by incoming light. By changing the CCD sense window timing, one can increase or decrease the pixel charge amount. This is similar to adjusting a shutter on a camera from, for example, 1/60 second to 1/30 second, so as to increase the exposure time of a film.

Figure 6:
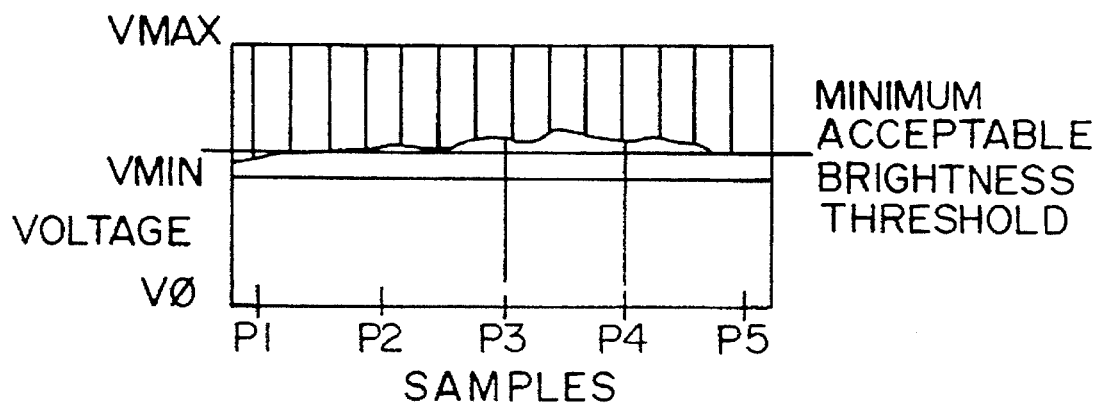
FIG. 6 graphically illustrates the results of an Overall Brightness Test that is performed on the illuminating device that can be employed in the scanner of FIG. 1.

FIG. 6 illustrates the results of an overall brightness test in which readings are obtained for a predetermined number of sample points P (such as the five points P1–P5). As long as the readings are at least equal to a selected minimum acceptable brightness threshold level, and not greater than a selected maximum acceptable brightness threshold level, one can conclude that the lamp operates satisfactory. However, if the gain adjustment on the scanning array 40 is too low, or the output of the lamp 38 is flat enough but insufficient to be useful, the CCD sense window can be varied slightly in order to change the CCD array exposure time. Alternatively, if the brightness of the lamp 38 is greater than the selected maximum acceptable brightness threshold level, the CCD array will become saturated, and the CCD sense window can be varied to decrease the CCD array exposure time, as will be described below.

In order to permit the CCD sense window to be adjusted, the CCD array 40 must be originally designed and adjusted to operate with the preselected CCD sense window timing. Thereafter, as the overall brightness of the lamp 38 falls below the selected minimum acceptable brightness threshold level, due for instance, to aging of the lamp 38, the CCD sense window can be lengthened by increasing the time period before the accumulated voltages on the CCD elements are shifted to the holding registers. Alternatively, if the brightness of the lamp 38 is above the selected maximum acceptable brightness threshold level, the sense window can be shortened by decreasing the time period before the accumulated voltages on the CCD elements are shifted to the holding registers.

By performing the above-described tests, one can determine whether the scanning array 40 is likely to produce an acceptable result, without having to actually perform a pre-scan and view the results. These tests enable one to determine whether the lamp 38 is sufficiently warmed up and as stable as it is likely to become within a reasonable time, whether the output profile is sufficiently flat, and whether the overall image result can be made bright enough. These determinations can be performed after the lamp 38 stabilizes, and by adjusting the CCD sense window, as needed, to compensate for the aging of the lamp 38 (or, for the use of an overly bright lamp 38), before initiating the calibration operation with respect to the reference calibration strip 36.

By performing the above tests, it is possible to obtain data indicating the average warm-up time for a lamp as it ages. Thus, it is possible to predict the remaining useful life of the lamp. In addition, these tests can be performed on new lamps at the time of manufacture, assisting in, for example, the grading or classification of the lamp for use in particular applications, which can be in addition to being used in an imaging device. For instance, the graded lamp could be used in a sunlamp where it is desired to have a uniform brightness so as to produce an even tan.

Figure 9:
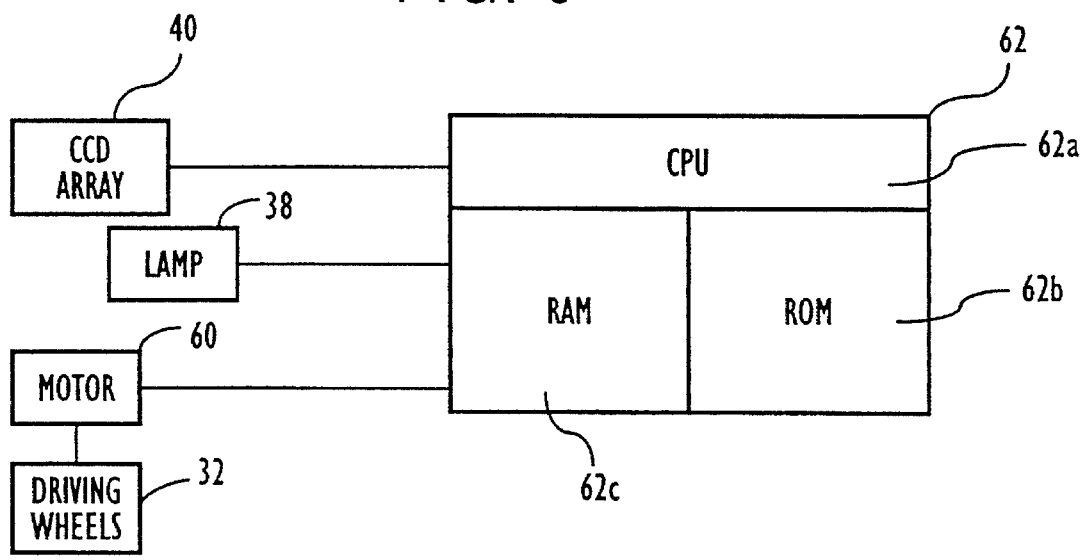
FIG. 9 illustrates a schematic block diagram of essential components of the scanner of FIG. 1.

FIG. 9 illustrates a black box diagram of the essential elements of the scanner 10 that performs the above-described tests. A controller 62 comprises a processor (CPU) 62a, a read only memory (ROM) 62b, and a random access memory (RAM) 62c. The ROM 62b contains one or more routines, illustrated in FIGS. 7A and 7B, that are performed by the CPU 62a. The CPU 62a controls the operation of the lamp 38 to illuminate the white reference strip (or document sheet). Light that is reflected from the white reference strip (or document sheet) is detected by the CCD array 40, which provides electrical signals to the controller 62. The CPU 62a translates the electrical signals into a form that represents what has been scanned, temporarily storing the translated electrical signals in the RAM 62c. The controller 62 also controls the rotational speed of the motor 60, and thus driving wheels 32, to ensure that the image reading unit travels across the platen glass 13 at a desired rate of speed. Further, the controller 62 controls lamp 38 to prevent undesired scans, e.g., when a "lamp fail" or error condition occurs, the controller deactivates the lamp 38 and/or turns OFF the scanner to prevent an erroneous scan.

It is understood that the present invention is not limited to an embodiment in which the document carrier 15 is stationary and the controller 62 controls the movement of the CCD array (or similar type CCD array/optical assembly). The present invention is equally applicable to an embodiment in which the document carrier 15 travels across the CCD array at a desired rate of speed.

Figure 7A:
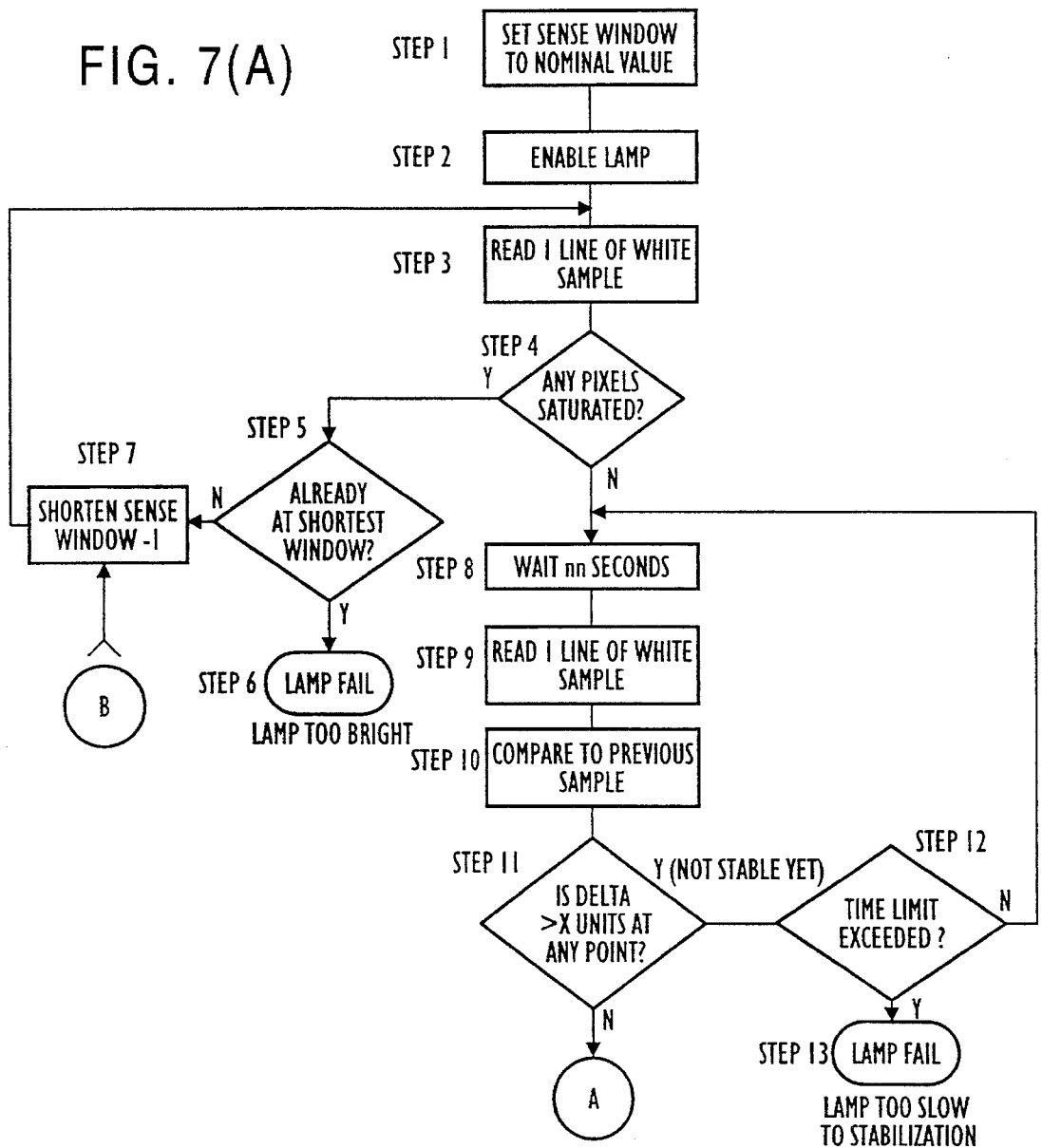
FIGS. 7A and 7B illustrate a flowchart for performing adaptive lamp control to determine the performance of the illuminating device according to a first preferred embodiment of the present invention.
Figure 7B:
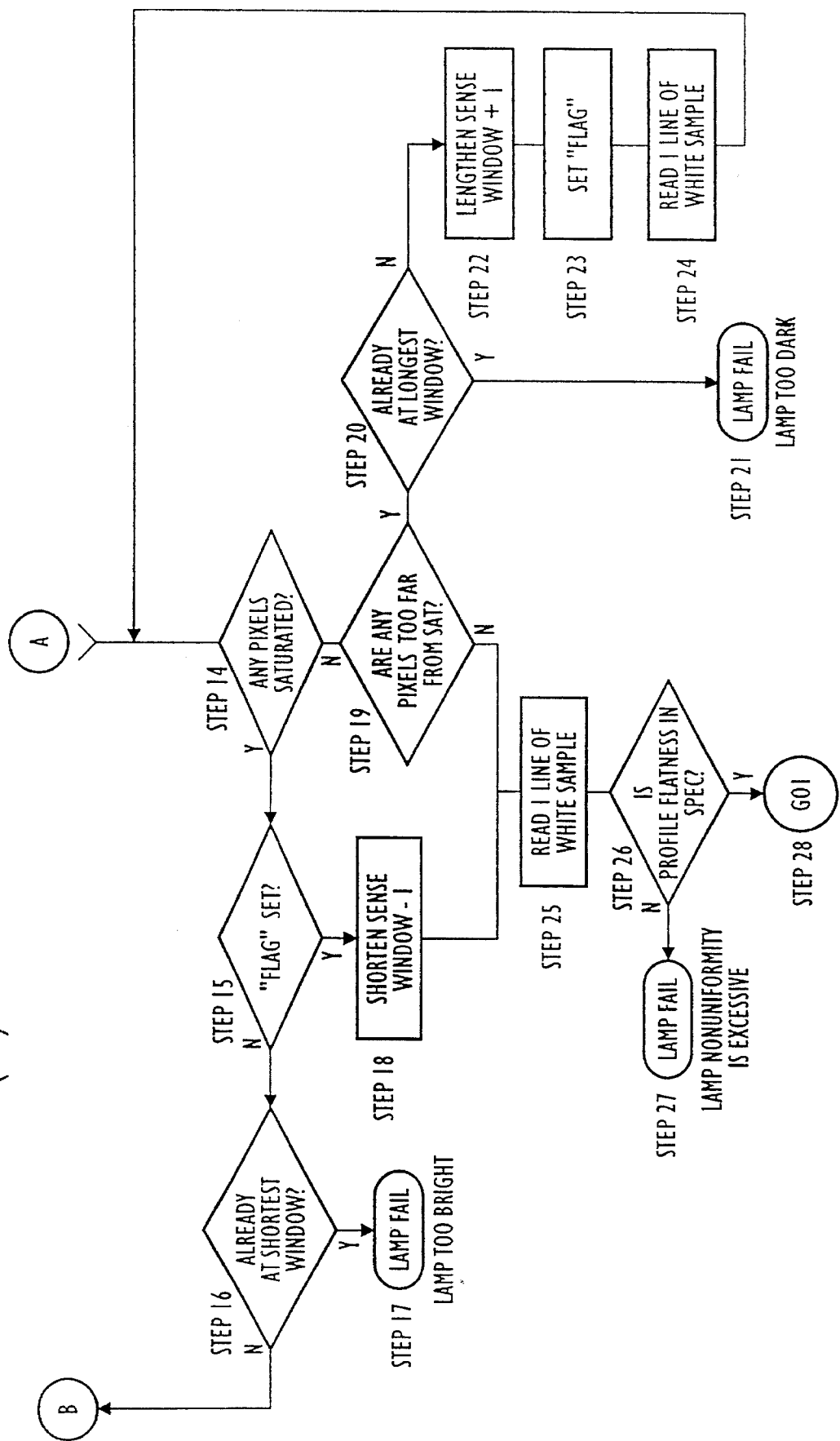

The adaptive lamp control routine of the present invention is illustrated in FIGS. 7A and 7B. As noted above, the adaptive lamp control routine is stored in the ROM 62b associated with the imaging device and is executed by the CPU 62a associated with the imaging device. However, it is understood that the present invention is not limited to such a construction. For example, the adaptive lamp control program can be part of an external apparatus, such as a computer, that is connectable to the interface connector 30 of the imaging device 10. Alternatively, the adaptive lamp control program can be implemented by a device that is utilized to test the lamp 38 during its manufacturing process. Furthermore, the adaptive lamp control can be implemented in hardware; that is, as an electrical circuit.

Referring to FIGS. 7A and 7B, the sense window is set to a predetermined nominal value in step 1. Generally, the predetermined nominal value is selected to produce an exposure level in which the pixels of the imaging array 40 will not be saturated. The lamp 38 is then activated in step 2 to illuminate the reference calibration strip 36. A white sample reading of the calibration strip 36 is then obtained in step 3 for the purpose of performing the brightness stability test, as was previously described.

Obviously, an additional test may be performed at this point to check for a totally black (e.g., unlit) lamp.

In step 4, a determination is made as to whether any pixels in the imaging array 40 are saturated. If any pixels are saturated, step 5 is executed to determine whether the sense window is closed down to its minimum exposure time. If the sense window is set to its shortest exposure time, a determination is made that the lamp 38 is too bright, and a lamp failure indication is provided in step 6. However, if the sense window is not set to its shortest exposure time, the sense window is reduced by one predetermined increment in step 7, and the program returns to step 3 to repeat the process of steps 3–7 until all of the pixels in the array 40 are no longer saturated, or the lamp is declared to be defective.

When it is determined in step 4 that none of the pixels are saturated, step 8 is executed to wait a predetermined period of time (nn seconds) to allow the brightness of the lamp 38 to stabilize. When the predetermined time period elapses, the white calibration strip 36 is re-read to obtain a second white sample reading, and compared to the previous reading (steps 9 and 10). A determination is then made in step 11 as to whether the absolute value of the old white sample reading less the new white sample reading is greater than a predetermined value X. If this difference is greater than the predetermined value X, it means that the brightness of the lamp 38 has not yet stabilized. Accordingly, step 12 is executed to determine whether a preset testing time limit has elapsed. This step is incorporated in the embodiment of the present invention so as to prevent the occurrence of an infinite loop in the event the lamp never stabilizes. That is, if the brightness of the lamp constantly varies, the program will proceed to step 13 when the set test time period elapses and indicate that a lamp failure exists. However, if the absolute value of the old white sample reading minus the new white sample reading is greater than a predetermined value X, but the preset test time period has not elapsed, the program returns to step 8 to wait another nn seconds before taking a new white sample reading.

When it is determined in step 11 that the brightness of the lamp 38 has stabilized (meaning that the absolute value of the earlier white sample reading minus the present white sample reading is less than or equal to the predetermined value X), the program proceeds to step 14 (see FIG. 7B) to determine whether any pixels have become saturated as a result of the lamp 38 possibly increasing in brightness as it stabilizes. If it is determined that any pixels in the array 40 are saturated, it is possible that the saturation may be due to the sense window having been set to too great a setting (such as is caused in step 22, to be discussed below). However, after the first time step 14 is executed, any pixel saturation that may exist cannot be due to the sensing window having been increased, since step 7 (to be discussed below) shortens the sense window. Accordingly, a determination is made in step 16 (after obtaining a negative determination in step 15, which will be explained below), as to whether the sense window has been set to the shortest possible exposure time. If the sense window can not be shortened, it means that the saturation of the pixels can not be eliminated. Hence, a lamp failure indication is given in such case.

If step 16 determines that the sense window can be shortened, the program returns to step 7, wherein the sense window is decreased by one predetermined increment. Thereafter, the program returns to step 3, so as to repeat the stability test, since the possibility exists that the pixels may have become saturated while the imaging device 10 was waiting for the brightness of the lamp 38 to stabilize, and this saturation could have been mistaken as an indication that the lamp brightness has stabilized. Thus, by re-executing step 7, the program is able to check for this possibility.

If it is determined in step 14 that no pixels are saturated, the flatness profile test is performed (step 19) to determine whether the pixels are too dark, based upon some preset exposure level limit. That is, a test is performed to determine whether the pixels are too far removed from being saturated, since such a situation would result in a scan having a restricted dynamic range, and hence, a scanned image having a reduced number of shades of gray. If the program determines in step 19 that the pixels are not too far from being saturated, the program proceeds to step 25, which will be discussed below. If it is determined that dark pixels do exist, and the sense window is already at the longest exposure setting, a lamp failure indication is provided (steps 19–21). Of course, it is recognized that such a determination could represent that there is actually a problem with the imaging array 40 itself (and not the lamp 38), or that an adjustment to the imaging device 10 is required. However, regardless of the actual fault condition, an error indication is provided so as to prevent the occurrence of an erroneous scan.

If it is determined in step 20 that the sense window is not at the longest possible exposure value, the sense window is increased by one predetermined increment and a flag is set (steps 22 and 23). Another reading is taken of the white reference calibration strip 36, and the program returns to step 14 to determine whether any pixels in the CCD array 40 are now saturated.

If the predetermined increments for adjusting the sense window is large, it is possible that pixels in the array 40 can become saturated, resulting in the need to shorten the sense window. Thereafter, the pixels in the array 40 could be too far removed from being saturated (adversely affecting the dynamic range of the array 40), requiring that the sense window be increased (lengthened) by the predetermined increment. The program would thus be caught in a loop, repeatedly reducing and increasing the sense window.

Accordingly, the flag set at step 23 is used to prevent the occurrence of such a loop.

Step 15 is provided to prevent this situation. The first time the adaptive lamp control program is executed, the result of this test is negative, since step 23 will not have been previously executed. Thus, the program will proceed to step 16, as was described above. However, if the sense window adjustment performed in step 22 causes any pixels in the array 40 to become saturated, this will be caught by the re-execution of step 15, since the flag will have been set in step 23. Thus, the program will proceed from step 15 to step 18, wherein the sense window is decreased by one predetermined increment to take the array 40 out of saturation. This corrects, for instance, when an increase of the sense window in a previous adjustment attempt results in an "overshooting" of the desired setting of the sense window in a current adjustment attempt.

A white sample reading of the calibration reference strip 36 is re-taken, just in case the sense window had been shortened by the execution of step 18 just prior to the execution of step 25. A test is then performed to determine whether the overall flatness profile is sufficiently flat for the chosen application. The difference between a maximum pixel reading of the array 40 and a minimum pixel reading of the array 40 is compared to a predetermined specification. If this comparison indicates that the flatness profile is outside the desired specification range, a lamp non-uniformity error indication is provided (step 27). On the other hand, if the comparison indicates the difference is within the specification range, the imaging device 10 proceeds to step 28 to begin an imaging (e.g., scanning) operation.

Figure 8:
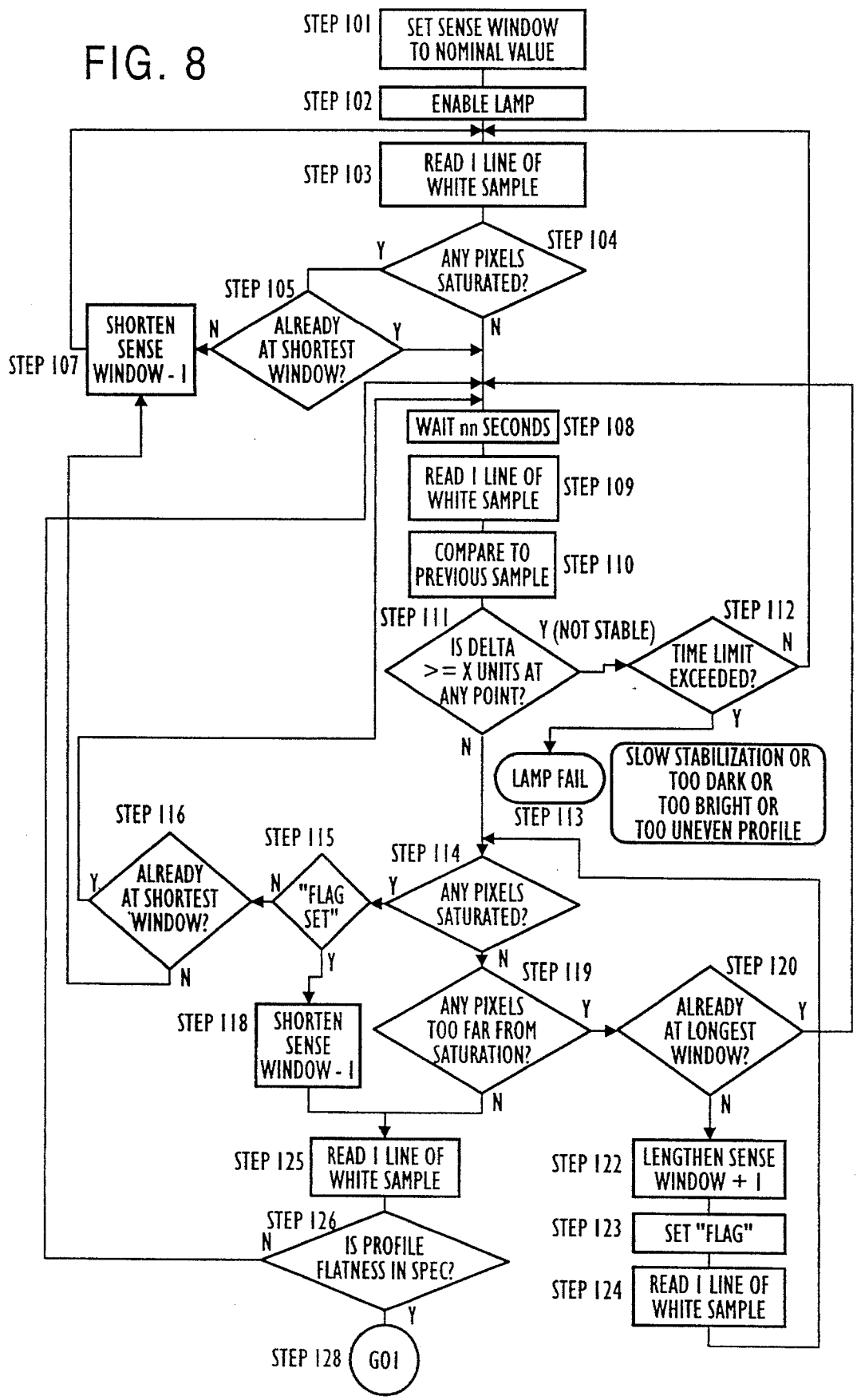
FIG. 8 illustrates a flowchart of a second preferred embodiment of the present invention for performing adaptive lamp control to determine the performance of an illuminating device.

A second embodiment for diagnosing a performance of an illuminating device 38 is illustrated in FIG. 8. Steps 101–128 of this embodiment are similar to steps 1–28 of the first embodiment of FIGS. 7A and 7B, respectively. For example, step 101 in FIG. 8 corresponds to step 1 in FIG. 7A; step 102 in FIG. 8 corresponds to step 2 in FIG. 7A; and, step 126 in FIG. 8 corresponds to step 26 in FIG. 7B. Accordingly, a detailed description of the embodiment of FIG. 8 will not be repeated. Rather, only a description detailing how the second embodiment differs from the first embodiment will be given.

The second embodiment of FIG. 8 differs from the first embodiment of FIGS. 7A and 7B in that, rather than indicating a lamp failure when a particular test fails, as indicated in the first embodiment, the method of the second embodiment returns to step 108 and waits for the maximum number of seconds nn to elapse for all failure modes. That is, the embodiment illustrated in FIG. 8 does not include steps that correspond to steps 6, 17, 21 and 27 in FIGS. 7A and 7B.

According to the second embodiment, if steps 105 or 116 indicate that the sense window is already at the shortest window, the process returns to step 108 to wait nn seconds. Conversely, if it is determined at step 120 that the sense window is set to the longest window, the process returns to step 108, waiting nn seconds before reading 1 line of the white reference sample 36. Finally, if step 126 determines that the flatness profile is outside of the desired specification range, the process also returns to step 108.

Thereafter, at step 111 a determination is made as to whether the absolute value of an old white sample reading less a new white sample reading is greater than a predetermined value X. If this difference is greater than the predetermined value X, it means that the brightness of the lamp 38 has not yet stabilized. Accordingly, step 112 is executed to determine whether a preset testing time limit has elapsed. If the brightness of the lamp constantly varies, the program proceeds to step 113, indicating the existence of a lamp failure, such as the lamp taking too long to stabilize, that the lamp is too dark or too bright, or that the flatness profile of the lamp is too uneven.

While the invention has been particularly shown and described with reference to the preferred embodiments thereof, it is understood by those skilled in the art that various alterations in form and detail may be made without departing from the spirit and scope of the invention, as defined by the following claims. In addition, it is understood that there are many ways of implementing the three basic checks described above. For instance, if the test performed in step 26 (or step 126) indicates that the flatness profile is outside of a desired range, a re-test can be performed to determine whether the new test will result in an in-specification reading. In addition, the invention can be used with a scanning array having a known reference output to grade lamps for use in various applications. Thus, lamps that do not pass all the tests can be graded for use in non-critical applications, reducing the number of rejected lamps that are produced. Further, the present invention can be used to grade lamps that are to be used in applications other than imaging arrays, such as, for example, testing a lamp for use in illuminating a living environment, where it is desired to obtain an even, predetermined illumination level.

We claim:

1. A method for determining the useability, of a radiation emitting device associated with an imaging device, comprising the steps of:

supplying electrical power to an elongated radiation emitting device so that the elongated radiation emitting device emits radiation towards a reference strip;

receiving a beam of radiation that is reflected from the reference strip with an imaging array;

determining whether output power of the elongated radiation, emitting device has stabilized within a predetermined period of time by successively measuring the received radiation beam at a plurality of locations along the elongated radiation emitting device, and comparing a present measurement with an immediately preceding measurement, the output power of the elongated radiation emitting device being determined to have stabilized when a difference value between two measurements is less than a selected value;

activating an alarm to convey a failure condition if it is determined that the output dower of the elongated radiation, emitting device has not stabilized;

determining a profile flatness of the elongated radiation, emitting device, when it is determined that the output power of the elongated radiation emitting device has stabilized, by comparing radiation measurement readings obtained at a predetermined number of sample points at a predetermined time interval along the elongated radiation emitting device to one another, the measurement readings yielding a greatest reading and a smallest reading;

activating the alarm to convey the failure condition if it is determined that an absolute value of a difference between the greatest value and the smallest value exceeds a pre-selected maximum allowable difference;

determining overall brightness of the elongated radiation emitting device, when the absolute value does not exceed the selected maximum allowable difference, by determining whether radiation measurement readings at a predetermined number of sample points along the elongated radiation emitting device are at least equal to a selected minimum acceptable brightness threshold level;

activating the alarm to convey the failure condition if it is determined that at least one radiation measurement reading at the predetermined number of sample points along the elongated radiation emitting device is less than the selected minimum acceptable brightness threshold level;

permitting an imaging operation by the imaging device if the alarm is not activated; and predicting a useful remaining life of the radiation emission device based upon past period of time determinations required for the output power of the radiation emitting device to stabilize.

2. The method of claim 1, further comprising the step of increasing a sense window of the imaging array to increase an exposure time of the reflected radiation beam on the imaging array, thus increasing a received overall brightness of the elongated radiation emitting device, and then repeating the overall brightness determination, if it is determined that at least one of the predetermined number of sample points along the elongated radiation emitting device is less than the selected minimum acceptable brightness threshold level.

3. The method of claim 2, further comprising the step of decreasing the sense window of the imaging array to decrease the exposure time of the reflected radiation beam on the imaging array, thus decreasing the received overall brightness of the elongated radiation emitting device, and then repeating the overall brightness determination, if it is determined that at least one of the predetermined number of sample points along the elongated radiation emitting device is greater than a selected maximum acceptable brightness threshold level.

4. The method of claim 1, further comprising the steps of:

determining whether the radiation measurement readings at the predetermined number of sample points along the elongated radiation emitting device exceed a selected maximum acceptable brightness threshold level; and indicating the failure condition if it is determined that at least one radiation measurement reading at the predetermined number of sample points along the elongated radiation emitting device exceeds the selected maximum acceptable brightness threshold level.

5. The method of claim 1, wherein said imaging device comprises a scanner that determines the useability of the radiation emitting device.

6. An apparatus for determining the quality of an illuminating device, comprising:

means for emitting light by said illuminating device;

means for measuring said emitted light;

means for determining whether output power of said illuminating device has stabilized within a predetermined period of time based upon a comparison of a present output power measurement of said illuminating device with an immediately preceding output power measurement;

means for determining whether said emitted light of said illuminating device is within a predetermined value, said determining means comprising means for ascertaining an overall brightness of said illuminating device;

an alarm for conveying that said determining means determines that said light emitted by said illuminating device is less than a selected minimum acceptable brightness threshold level; and predicting a useful remaining life of the radiation emission device based upon past period of time determinations required for the output power of the radiation emitting device to stabilize.

7. The apparatus of claim 6, wherein said predetermined value comprises a minimum value.

8. The apparatus of claim 6, wherein said predetermined value comprises a maximum value.

9. The apparatus of claim 6, wherein said measuring means comprises means for determining a uniformity of a brightness of said illuminating device, over the surface of said light emitting means.

10. The apparatus of claim 9, further comprising means for determining whether said brightness uniformity is within a pre-selected range.

11. The apparatus of claim 6, wherein said overall brightness ascertaining means comprises means for determining whether said brightness of said illuminating device is within said predetermined value within a prescribed time period.

12. The apparatus of claim 6, wherein said determining means comprises means for determining a stability of brightness of said illuminating device over a predetermined period of time.

13. The apparatus of claim 6, wherein said illuminating device is associated with a scanner.

14. A method for determining a performance of an illuminating device, comprising the steps of:

activating the illuminating device to emit radiation;

measuring an output of the radiation over a plurality of time periods;

determining whether the radiation output stabilizes within a predetermined period of time after the illuminating device is activated;

measuring a radiation level of the illuminating device at a plurality of locations of the illuminating device;

determining whether the radiation level of the illuminating device at the plurality of locations is within a preselected range;

measuring an overall radiation intensity of the illuminating device;

determining whether the overall radiation intensity is at least equal to a selected minimum value;

activating an alarm to convex a failure condition if at least one determining step determines that an undesirable condition exists; and predicting a useful remaining life of the illuminating device based upon past period of time determinations required for the radiation output of the illuminating device to stabilize.

15. The method of claim 14, further comprising the step of de-activating the illuminating device and-indicating an unacceptable determination if the radiation output does not stabilize within the predetermined time period, or if the radiation level of the illuminating device at the plurality of locations is outside of the preselected range, or if the overall radiation intensity is less than the selected minimum value.

16. The method of claim 15, further comprising the step of repeating, by a preset number of times, any determination that results in an unacceptable determination.

17. The method of claim 15, further comprising the step of repeating any determination that results in the unacceptable determination for a prescribed time period.

18. The method of claim 14, wherein the step of determining whether the radiation output stabilizes within the predetermined period of time from when the illuminating device has been activated comprises comparing a previous measurement result to a current measurement result to determine the similarity of the measurement results.

19. The method of claim 14, further comprising the step of repeating, by a preset number of times, any determination that results in an unacceptable determination.

20. The method of claim 14, further comprising the step of repeating any determination that results in an unacceptable determination for a prescribed time period.

21. The method of claim 14, further comprising the step of determining whether the overall radiation intensity exceeds a selected maximum value.

22. The method of claim 14, further comprising providing a scanner and determining a performance of said illuminating device in said scanner.

23. An apparatus for determining the quality of an illuminating device, comprising:

a sensor;

means for activating said illuminating device to emit a source of light, said light source being directed towards a reference strip and being detected by said sensor;

an analyzer that interprets output signals of said sensor to determine a plurality of light emission characteristics of said illuminating device;

an alarm that is activated to convey that at least one of said plurality of determined light emission characteristics of said illuminating device is below a preselected minimum value; and means for predicting a useful remaining life of the illuminating device, wherein one of the plurality of light emission characteristics comprises a stabilization characteristic of the illuminating device, and wherein the useful remaining life of the illuminating device is based upon the stabilization characteristic of the illuminating device.

24. The apparatus of claim 23, wherein said sensor comprises a scanning array.

25. The apparatus of claim 24, wherein said scanning array comprises a charge coupled device.

26. The apparatus of claim 23, wherein said analyzer comprises:

means for determining whether an output of said illuminating device has stabilized;

means for determining an output flatness of said illuminating device if it is determined that said output of said illuminating device has stabilized; and means for determining whether an overall brightness of said illuminating device is at least equal to a minimum set value if it is determined that said output flatness of said illuminating device is within a predetermined range.

27. The apparatus of claim 26, wherein said means for determining whether an output of said illuminating device has stabilized comprises means for comparing an immediately preceding output reading with a current output reading.

28. The apparatus of claim 26, wherein said means for determining said output flatness of said illuminating device comprises means for obtaining a plurality of output readings at various locations of said illuminating device, said plurality of output readings at various locations being compared to each other to determine a variation from one location to another location.

29. The apparatus of claim 26, further comprising means for determining whether said overall brightness of said illuminating device exceeds a maximum set value.

30. The apparatus of claim 23, wherein said analyzer comprises:

means for determining whether an output of said illuminating device has stabilized;

means for determining an output flatness of said illuminating device; and means for determining whether an overall brightness of said illuminating device is at least equal to a minimum set value.

31. The apparatus of claim 23, wherein said sensor comprises a scanner.

32. The apparatus of claim 23, further comprising an indicator that indicates when said analyzer determines that a condition of said illuminating device is outside of a desired performance range.

33. A method for determining a performance of an illuminating device, comprising the steps of:

detecting a light beam produced by the illuminating device;

determining whether the detected light beam indicates that the performance of the illuminating device is within a plurality of desired prescribed ranges, the detected performance of the illuminating device being used to determine a useful remaining life of the illuminating device based upon an output stabilization characteristic of the illuminating device; and activating an alarm conveying that the performance of the illuminating device is determined to be outside of at least one desired prescribed range.

34. The method of claim 33, further comprising the step of providing an indication when it is determined that the performance of the illuminating device is outside of the desired prescribed range.

35. The method of claim 33, further comprising the steps of:

employing the illuminating device in an imaging device; and calibrating the illuminating device to compensate for detected variations in the illuminating device if it is determined that the performance of the illuminating device is within the prescribed range.

36. The method of claim 33, wherein the determining step comprises:

a first step of determining whether an output of the illuminating device has stabilized;

a second step of determining an output flatness of the illuminating device; and a third step of determining the overall brightness of the illuminating device.

37. The method of claim 36, wherein the first determining step is performed up to a predetermined period of time.

38. The method of claim 36, wherein the first determining step is performed up to a predetermined number of times.

39. The method of claim 36, wherein the second determining step is performed if it is determined that the output of the illuminating device has stabilized, and the third determining step is performed if it is determined that the output flatness of the illuminating device is within a predetermined range.

40. The method of claim 36, further comprising the step of de-activating the illuminating device and indicating a test failure result if the detected light beam is determined not to have stabilized within a predetermined time period, or if the output flatness of the illuminating device is determined to be outside of a preselected range, or if the overall brightness of the illuminating device is determined to be less than a selected minimum value.

41. The method of claim 36, wherein the first determining step comprises comparing an immediately preceding light beam reading with a current light beam reading.

42. The method of claim 36, wherein the second determining step comprises comparing a plurality of light beam readings at various locations of the illuminating device with one another to determine a variation from one location to another location.

43. The method of claim 36, wherein the third determining step comprises obtaining a plurality of readings of the light beam at one time along a plurality of locations of the illuminating device and determining whether the plurality of readings are at least equal to a selected minimum acceptable brightness threshold level.

44. The method of claim 36, wherein the third determining step comprises obtaining a plurality of readings of the light beam at one time along a plurality of locations of the illuminating device and determining whether the plurality of readings exceed a selected maximum acceptable brightness threshold level.

45. The method of claim 33, further comprising providing a scanner and determining a performance of said illuminating device in said scanner.

46. The method of claim 33, further comprising the step of illuminating a reference strip with a beam of light emitted by the illuminating device, and wherein the step of detecting a light beam produced by the illuminating device comprising detecting a light beam that is reflected from the reference strip.

47. A method for diagnosing a performance of a radiation emitting device, comprising the steps of:

supplying electrical power to an elongated radiation emitting device so that the elongated radiation emitting device emits radiation;

receiving the radiation with an imaging array;

a first determining step of determining whether an output power of the elongated radiation emitting device has stabilized by successively measuring the received radiation beam at a plurality of locations of the elongated radiation emitting device, and comparing a present measurement of each of the plurality of locations of the elongated radiation beam with an immediately preceding measurement of each respective plurality of locations of the elongated radiation beam, the output power of the elongated radiation emitting device being determined to have stabilized when a difference value between two consecutive period of time measurements is less than a selected value;

a second determining step of determining a profile flatness of the elongated radiation emitting device by comparing radiation measurement readings at a predetermined number of sample points obtained during a single certain time interval along the elongated radiation emitting device to one another;

a third determining step of determining an overall brightness of the elongated radiation emitting device by determining whether radiation measurement readings at a predetermined number of sample points along the elongated radiation emitting device are at least equal to a selected minimum acceptable brightness threshold level;

predicting a useful remaining life of the elongated radiation emitting device based upon past period of time determinations required for the elongated radiation emitting device to stabilize; and activating an alarm conveying a failure condition after the first determining step, the second determining step and the third determining step are performed if either the first determining step, the second determining step or the third determining step results in an undesired determination.

48. The method of claim 47, further comprising the step of increasing a sense window of the imaging array to increase an exposure time of the radiation beam on the imaging array, thus increasing a received overall brightness of the elongated radiation emitting device and then repeating the overall brightness determination, if it is determined that at least one of the predetermined number of sample points along the elongated radiation emitting device are less than the selected minimum acceptable brightness threshold level.

49. The method of claim 47, further comprising providing a scanner and determining a performance of said radiation emitting device in said scanner.

50. The method of claim 47, wherein the step of emitting radiation comprises emitting radiation towards a reference strip, and wherein the step of receiving the radiation comprises receiving radiation that is reflected from the reference strip.

51. The method of claim 47, further comprising the step of decreasing a sense window of the imaging array to decrease an exposure time of the radiation beam on the imaging array, thus decreasing a received overall brightness of the elongated radiation emitting device and then repeating the overall brightness determination, if it is determined that at least one of the predetermined number of sample points along the elongated radiation emitting device is greater than a selected maximum acceptable brightness threshold level.

52. A method for determining a performance characteristic of an illuminating device, comprising the steps of:

activating the illuminating device to emit radiation;

determining a period of time required for an output level of the radiation emitted by the illuminating device to stabilize after the illuminating device is activated; and predicting a characteristic of the illuminating device based upon past period of time determinations required for the output level of the radiation emitted by the illuminating device to stabilize.

53. The method of claim 52, wherein the step of predicting a characteristic of the illuminating device comprises predicting a remaining life expectancy of the illuminating device.

54. A method for determining the useability of a radiation emitting device associated with an imaging device, comprising the steps of:

initiating an automatic diagnostic operation in which a plurality of operating parameters of the radiation emitting device are automatically determined prior to an initiation of an initial imaging operation, the initiating step comprising the steps of:

supplying electrical power to an elongated radiation emitting device so that the elongated radiation emitting device emits radiation towards a reference strip;

receiving a beam of radiation that is reflected from the reference strip with an imaging array;

performing a first diagnostic operation to determine whether output power of the elongated radiation emitting device at a plurality of locations has stabilized within a predetermined period of time by obtaining a plurality of measurements of the received radiation beam at the plurality of locations along the elongated radiation emitting device, and comparing the plurality of measurements, the output power of the elongated radiation emitting device being determined to have stabilized when a difference value obtained as a result of the comparison of the plurality of measurements is less than a selected value;

activating an alarm to convey a failure condition if it is determined that the output power of the elongated radiation emitting device has not stabilized;

performing a second diagnostic operation to determine a profile flatness of the elongated radiation emitting device, when it is determined that the output power of the elongated radiation emitting device has stabilized, by comparing radiation measurement readings obtained at a predetermined number of sample points during a single predetermined time interval along the elongated radiation emitting device to one another, the measurement readings yielding a greatest reading and a smallest reading;

activating the alarm to convey the failure condition if it is determined that an absolute value of a difference between the greatest reading and the smallest reading exceeds a pre-selected maximum allowable difference;

performing a third diagnostic operation to determine overall brightness of the elongated radiation emitting device, when the absolute value does not exceed the selected maximum allowable difference, by determining whether radiation measurement readings at a predetermined number of sample points along the elongated radiation emitting device are at least equal to a selected minimum acceptable brightness threshold level; and activating the alarm to convey the failure condition if it is determined that at least one radiation measurement reading at the predetermined number of sample points along the elongated radiation emitting device is less than the selected minimum acceptable brightness threshold level; and enabling an initial imaging operation by the imaging device upon completion of the automatic diagnostic operation if the alarm is not activated, wherein a useful remaining life of the elongated radiation emitting device is predicted based upon past period of time determinations required for the elongated radiation emitting device to stabilize.

\* \* \* \* \*

UNITED STATES PATENT AND TRADEMARK OFFICE
CERTIFICATE OF CORRECTION

PATENT NO. : 5,495,329
DATED : February 27, 1996
INVENTOR(S) : E. ANDERSON, II et al.

It is certified that error appears in the above-indentified patent and that said Letters Patent is hereby corrected as shown below:

At column 16, line 26 (claim 1, line 1), change "useability," to ---useability---.

At column 16, lines 35-36 (claim 1, lines 9-10), change "radiation," to ---radiation---.

At column 16, line 47 (claim 1, line 21), change "radiation," to ---radiation---.

At column 18, line 43 (claim 14, line 18), change "convex" to ---convey---.

At column 18, line 51 (claim 15, line 2), change "and-indicating" to ---and indicating---.

At column 20, line 48 (claim 36, line 7), change "the" (first occurrence) to ---an---.

Signed and Sealed this

Seventeenth Day of December, 1996

Attest:

BRUCE LEHMAN

*Attesting Officer*     *Commissioner of Patents and Trademarks*